US 6,540,184 B2

(12) United States Patent
Thaxton

(10) Patent No.: US 6,540,184 B2
(45) Date of Patent: Apr. 1, 2003

(54) FLEXIBLE LEG FLASHLIGHT HOLDER

(76) Inventor: Rocky A. Thaxton, 11431 N. P St., LaPorte, TX (US) 77571

( * ) Notice: Subject to any disclaimer, the term of this patent is extended or adjusted under 35 U.S.C. 154(b) by 57 days.

(21) Appl. No.: 09/852,502

(22) Filed: May 10, 2001

(65) Prior Publication Data

US 2002/0167806 A1 Nov. 14, 2002

(51) Int. Cl.⁷ ................................................ F16M 13/00
(52) U.S. Cl. .................. 248/160; 248/178.1; 248/316.4
(58) Field of Search .............................. 248/160, 163.1, 248/163.2, 176.1, 177.1, 178.1, 316.4, 229.12, 229.22, 188.1, 188; 362/544

(56) References Cited

U.S. PATENT DOCUMENTS

| 628,714 A | 7/1899 | Ingersoll |
| 683,455 A | 10/1901 | Fergusson |
| 711,621 A | 10/1902 | Fergusson |
| 1,104,352 A | 7/1914 | Erlandsson |
| 1,227,738 A | 5/1917 | Bellis et al. |
| 1,688,148 A | 10/1928 | Martin |
| 2,010,058 A | 8/1935 | Carlson ...................... 362/396 |
| 2,036,567 A | 4/1936 | Cannon ...................... 362/269 |
| 2,067,868 A | 1/1937 | Vom Lehn .................. 362/296 |
| 2,597,670 A * | 5/1952 | Pinto ......................... 200/330 |
| 2,679,121 A | 5/1954 | Hoofer ........................ 248/488 |
| 2,684,822 A * | 7/1954 | Odin ........................... 248/160 |
| 2,727,137 A | 12/1955 | Oharenko .................... 362/306 |
| 3,495,795 A | 2/1970 | Brown ..................... 248/230.5 |
| 3,765,633 A | 10/1973 | Caudill ..................... 248/299.1 |
| 4,283,038 A | 8/1981 | Kurtz .......................... 248/478 |
| 4,413,801 A | 11/1983 | Lancaster et al. ......... 248/316.1 |
| 5,203,529 A | 4/1993 | Penniman ................... 248/228 |
| 5,602,948 A * | 2/1997 | Currie ......................... 362/554 |
| 5,836,563 A * | 11/1998 | Hsin-Yung ............... 248/316.4 |
| 5,842,670 A * | 12/1998 | Nigoghosian ............... 248/160 |
| 5,911,395 A | 6/1999 | Hussaini .................. 248/206.3 |
| 5,937,537 A * | 8/1999 | Miller ......................... 248/160 |

FOREIGN PATENT DOCUMENTS

| FR | 763188 | 4/1934 | ............ 248/229.12 |
| NL | 56083593 | 12/1956 | ............ 248/229.12 |

* cited by examiner

Primary Examiner—Ramon O. Ramirez
(74) Attorney, Agent, or Firm—Bracewell & Patterson, L.L.P.

(57) ABSTRACT

An assembly to selectively hold, position and provide a stable platform for a light source has malleable legs. The assembly has a pair of clamp members attached to a base. The legs attach to the base and are formed of electrical cable with an elastomeric insulation coating. An extension tube can interconnect the clamp member to the malleable, bendable leg portion to further increase the range of the flexible leg stand.

7 Claims, 3 Drawing Sheets

FLEXIBLE LEG FLASHLIGHT HOLDER

BACKGROUND OF THE INVENTION

1. Field of the Invention

The present invention relates to a flexible leg stand assembly. More particularly, the present invention relates to a flexible leg stand with extension tube to secure a source of illumination at a desired attitude and location.

2. Description of the Prior Art

There are numerous occasions when it is desirable to temporarily affix a source of illumination to an object. In this connection, it is common practice to use a support assembly to secure a light source in a desired location proximate a workbench. Such support assemblies are illustrated, for example, in U.S. Pat. Nos. 711,621; 2,727,137 and 1,688,148.

The disadvantage of each of the assemblies illustrated in these patents is the lack of flexibility to secure light sources of different sizes. In this connection, the support structures disclosed in these patents are designed to be secured to a lamp of a lighting socket of a predetermined diameter.

Such rigidity of application, while acceptable in areas utilizing standardized lighting fixtures, is generally not practical where lighting sources of many different configurations may be potentially used. For example, applications which contemplate the attachment of variously sized portable light sources, e.g. flashlights, cannot provide the desired utility for applications useful with yard implements, bicycle and motorcycle applications and other areas where it is desirable to temporarily mount a portable light source.

SUMMARY OF THE INVENTION

The present invention addresses the above-identified and other advantages of prior art attachment and mounting systems. A flexible leg stand has a substantially cylindrical body and a set of bendable legs. The body has a first surface, a first cavity, a second surface, a second cavity, a top interior surface and a bottom interior surface. The first cavity is defined by the top interior surface and the first surface. The second cavity is defined by the bottom interior surface and the second surface. The first cavity has a volume large enough to accommodate a plurality of looped upper ends of bendable legs, and the second cavity attaches to another body. Each of the legs is an insulated wire cable having a metal core surrounded by a covering of resilient elastomer. The legs are bendable into various shapes to cooperate and provide support for an object, such as a flashlight, at a distance from said legs. The legs will retain their shape until bent to a new shape. An extension section is available to interconnect the attachment system and the flexible leg stand.

Preferably each wire forms one of the leg loops at the upper end and extends downward to form a second leg. The first cavity has threads that engage the insulation on the double-over ends, similar to a wire nut, to retain the body to the legs.

The present attachment system also has arcuate faces on the stationary and traveling members and on the cushioned surfaces to provide a better grip on the flashlight. Additionally, a spring is used to provide a more secure closure.

DETAILED DESCRIPTION OF THE PREFERRED EMBODIMENTS

Figure 1:
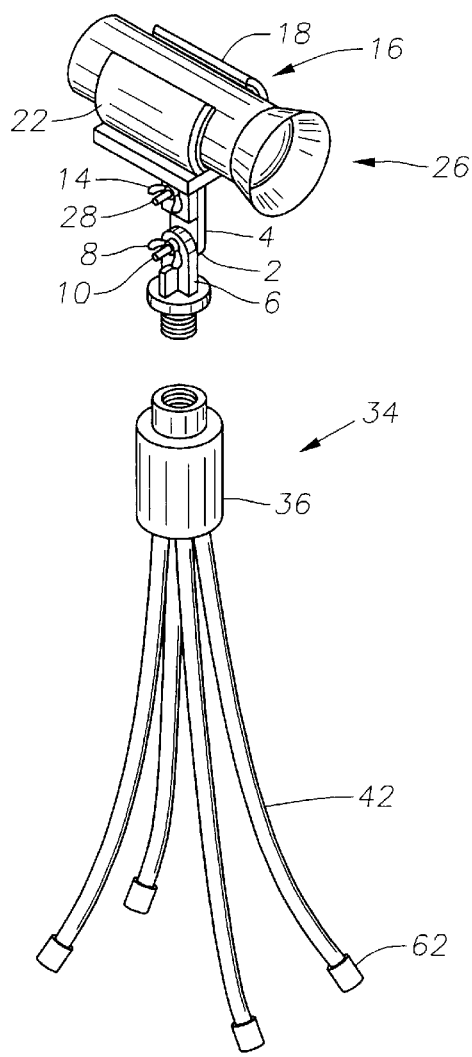
FIG. 1 is an exploded perspective view of a flexible leg stand and an attachment system constructed in accordance with this invention for holding a flashlight.

This specification incorporates by reference co-pending U.S. patent application Ser. No. 09/399,670 filed Sep. 21, 1999 by Mr. Rocky Thaxton, now U.S. Pat. No. 6,286,797

A pivot assembly 2 is comprised of a first stationary attachment member 4 and a second supporting base attachment member 6, where said first and second members are pivotally disposed vis-a-vis each other via a pivot or support means 8. In the illustrated embodiment of FIG. 1, pivot means 8 comprises a fastener, e.g. a bolt or support fastener 10, disposed through an aperture 12 (not shown) formed in both first 4 and second 6 members and secured with an adjustable locking fastener 14, e.g. a wingnut. In such a fashion, the first 4 and second 6 members are relatively moveable in at least one plane. Moreover, the relative position of the first 4 and second 6 members may be adjusted by loosening or tightening pivot means 8 in a conventional fashion.

First stationary member 4 may be affixed to or integrally formed with an attachment assembly 16 which generally comprises a stationary member 18 and a traveling member 20. Traveling member 20 is generally "L" shaped in configuration and defines an upright portion or traveling upright member 20 and a tongue or traveling plate (not shown). As illustrated, stationary member 18 also describes an "L" shape and includes a stationary upright portion 18 and a stationary base (not shown), where said stationary base defines a slot (not shown) sized to receive traveling member 20. The stationary upright portion 18 is joined to and extending orthogonally from the stationary base. The stationary base has a pair of spaced apart legs (not shown). Each leg has a free end and an inner surface with a groove formed therein (not shown). In such tongue and groove fashion, traveling member 20 is adapted to be slidably received within support member 18. The stationary attachment member 4 is joined to and extending from the stationary base in an opposite direction to the stationary upright member 18.

Support member 18 and traveling member 20 both define opposed "C" shaped contact surfaces 22, as illustrated in FIG. 1. In a preferred embodiment, surfaces 22 are provided with a cushioned, contact layer 24 to aid in securing said illumination assembly 26 in a relatively non-slip fashion. The traveling plate is carried in the slot and has lateral edges (not shown) that are slidably received within the channels of the legs. A traveling upright member 20 is joined to and extending from the traveling plate in opposed fashion to the stationary upright member 18. It is contemplated that layer 24 be made from a closed cell, foam rubber, through other materials of comparable performance are also contemplated within the spirit of the invention.

The relative juxtaposition of support member 18 and traveling member 20 is governed by a closure system which may include one or more conventional fastening systems, e.g. a bolt or attachment fastener 28 and nut 30, which may be selectively tightened about a given appliance, e.g. a flashlight 26. In such a fashion, the traveling member 20 is slid toward stationary member 18 until the object, e.g. a flashlight, is adequately compressed between the two so as to secure it in a desired position. The traveling member is then secured in place by tightening the fastening system.

Figure 2:
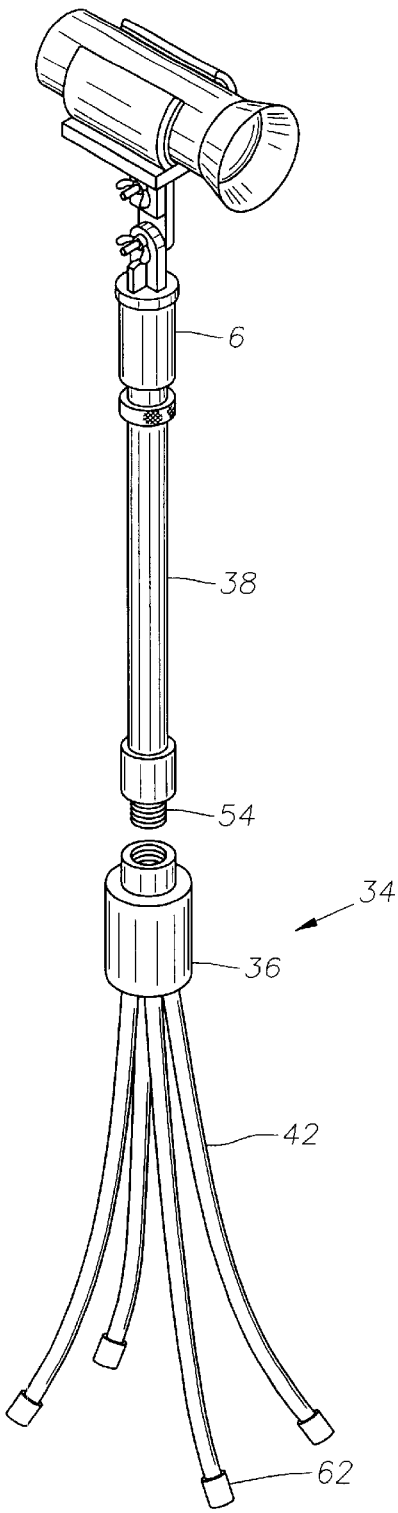
FIG. 2 is an exploded perspective view of the flexible leg stand of FIG. 1, showing also an extension section.

A spring 32 is located between the traveling upright member 20 and the stationary attachment member 4. The spring 32 is placed concentrically around fastener 28, and provides resiliency for a more secure fit when a flashlight 26 or other object is placed within the cushioned contact layer 24. It should be understood that while a flashlight 26 is envisioned, other objects such as a camera or sensor may be placed on the flexible stand 34 and held in place via an attachment assembly 16. Second supporting base attachment member 6 may be attached to a body member 36, as is seen in FIG. 1 or with a tube section 38 as is shown in FIG. 2. However, supporting base attachment member 6 may be formed integrally with either the tube section 38 or the body member 36.

FIG. 1 shows a flexible leg stand 34 with a body portion 36 for use with an attachment assembly 16 having a stationary attachment member 4 connected to a second supporting base attachment member 6 via a pivot assembly 2. Support fastener or bolt 10 connects the two attachment members 4 and 6 to one another. The body portion 36 has a first opening or cavity 40 on its bottom, the first opening 40 being large enough to accommodate a plurality of bendable flexible legs 42. The body portion 36 can be made of metal, plastic or wood. Alternatively the legs 42 may be doubled over or press fit within the body 36, or they may have an adhesive applied to more securely retain the legs 42 within the body 36. Each leg 42 is an insulated wire 58 of fairly heavy gauge, such as an automotive battery cable. Each leg 42 has a layer of elastomeric electrical insulation 60 which covers the metal core. Each cable is looped over to form a pair of legs 42. There are two pairs of legs 42 in the preferred embodiment. Cavity 40 has threads or internal grooves that engage the bight formed by the looped over cable ends, similar to a wire nut.

The legs 42 are malleable and bendable into various shapes to provide support for an object, such as a flashlight 26 at a distance from the legs 42. Usually, the legs 42 are bent into a U shape and the bight at the end is then inserted into the first cavity 40 and rotated to cause the threads to embed into the insulation 60.

Figure 4:
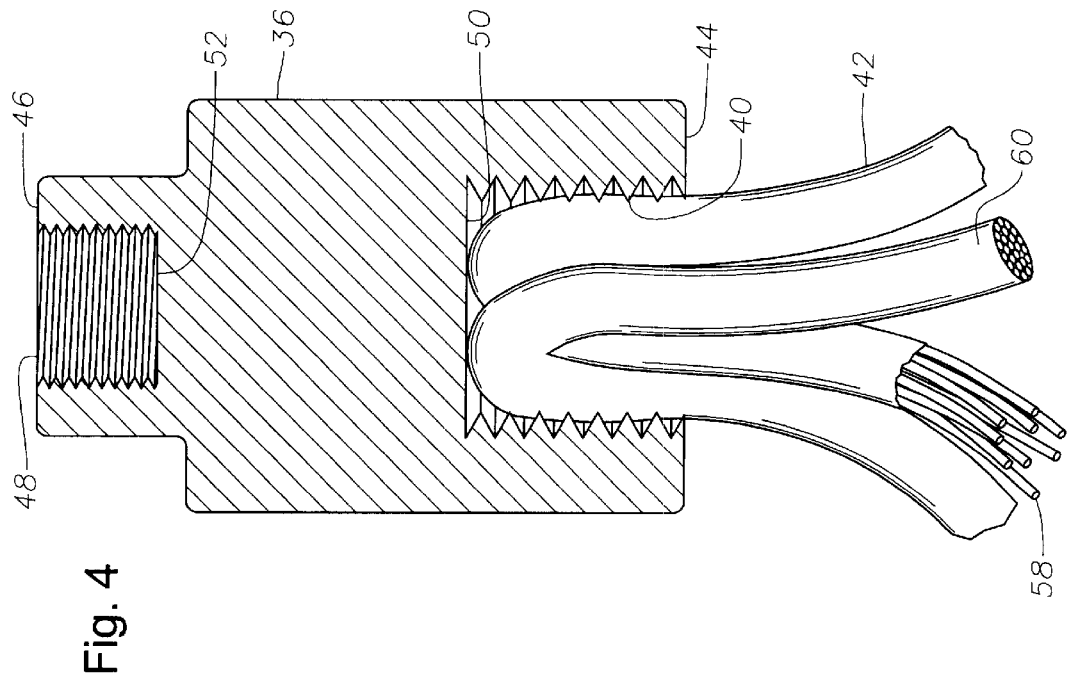
FIG. 4 is an enlarged cross-section view of a body portion of the leg stand of figure
Figure 3:
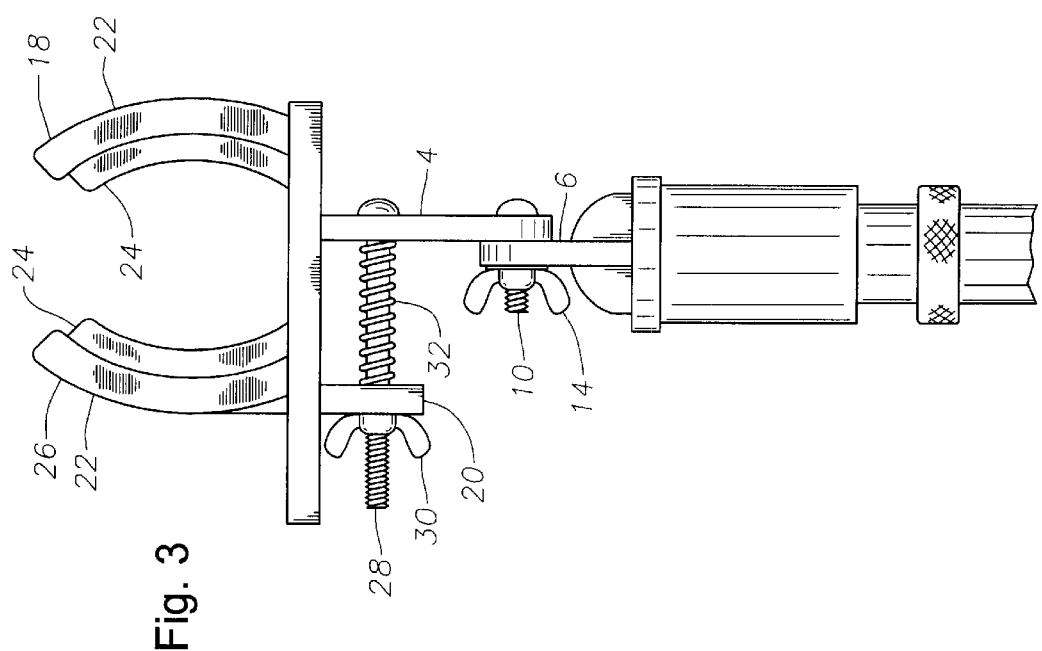
FIG. 3 is an enlarged side view of the attachment bracket for use with the leg stand of FIG. 1.

In the preferred embodiment it is envisioned that a metal wire 58 of sufficient gage and strength to accommodate repetitive bending motion and withstand stresses and fatigue created as a result of such applied force is selected and surrounded by a covering of resilient elastomer. Typically rubber or plastic will be used. It is possible to have a non-continuous piece of metal surrounded by plastic of sufficient flexibility to provide the desired characteristics. A bundle of wires 58 surrounded by an exterior sheath 60 as shown in FIG. 4 may be used to create each leg 42. A piece of cable wire has been used as a leg portion 42 with end caps 62 placed on each end of the cable. The cable is then bent into a U shape and inserted within the first cavity 40. Two pieces of cable inserted into the first cavity in this manner create four legs 42 to provide a stable platform as is shown in FIGS. 1 and 2.

The body 36 (see FIG. 4) is substantially cylindrical having a first surface 44, on one end into which the cavity 40 extends. Cavity 40 has a closed upper end 50. A second surface 46 is on the other end. A second threaded cavity 48 extends into the second surface 46 and has a closed lower end 52. The cavity 40 can also have threads 54 which attach to legs 42, which have threads (not shown). The second cavity 48 has fixing means such as threads or any suitable mechanical or chemical fastening system for attaching to either an extension portion or tube section 38 or a second supporting base attachment member 6 (see FIGS. 1 and 2).

Tube section 38 (FIG. 2) has male threads 54 located at a distal end to mate with the female threaded portion of second cavity 48 of body portion 36. It is well understood that varying the female and male threads on each part is possible, and that other mating mechanism exist. The plurality of resilient legs 42 may be made in a number of configurations, the main advantage is to have a sufficient number of legs to provide support for the light source 26 at a distance. It is envisioned that four legs 42 will be sufficient, however, three or five legs may also work depending upon the stability of the assembly upon attachment to a surface or post 56 (see FIGS. 5 and 6). Each leg 42 should be bendable and flexible and have the ability to provide a stable base for supporting a flashlight 26 as is shown in FIGS. 1 and 2. Each leg 42 should be malleable and flexible and this can be determined by the materials that make up the legs 42.

FIG. 2 shows the flexible leg stand assembly 34 connecting to a tube section 38 which attaches to a second supporting base attachment member 6, or the tube can be integral with the base attachment member 6. The tube section can vary in length, flexibility, rigidity and materials in a manner similar to the body portion 36. The tube can even telescope to vary in length depending upon the application.

Figure 5:
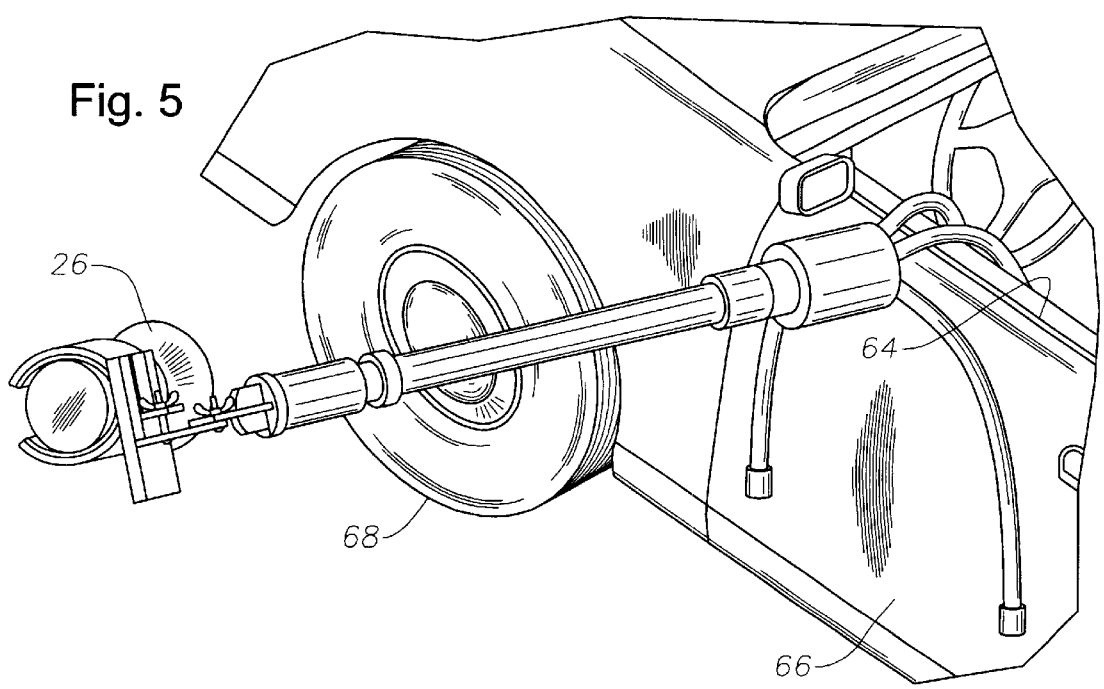
FIG. 5 shows one application of the leg stand of FIG. 2, for supporting an extended light.
Figure 6:
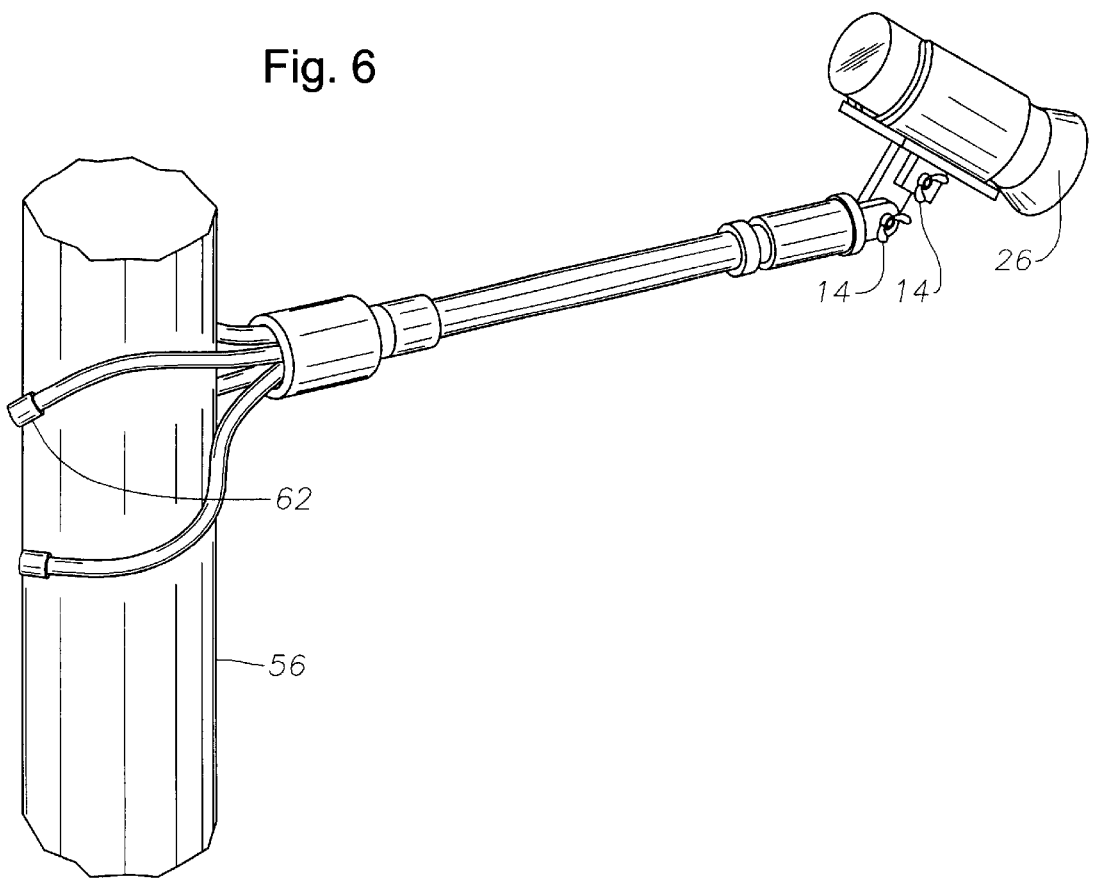
FIG. 6 shows another application of the leg stand of FIG. 2, showing the legs wrapping around a pole to provide support for a light at a distance.

In operation, FIG. 5 shows two flexible legs 42 being hooked-shaped and attaching over a car door window jamb 64, while another two legs rest 42 on the exterior of the car door 66. The light is positioned to shine on a front wheel 68, and this would be useful while changing a flat tire in low light conditions. The positioning of the light could be adjusted to suit the user changing the tire. FIG. 6 shows the flexible legs 31 wrapped around a pole or post 56 and thereby providing support for the light 26 which is adjusted using either of the two wing-nuts 14. This could be useful for outdoor applications, such as playing cards or reading. Additional uses not illustrated include providing a stable light source for working on plumbing underneath bathroom and kitchen cabinets, using the flexible legs on uneven surfaces such as the interior of an automobile engine compartment with the hood in an open position, placing the flexible leg stand on a staircase, with two legs on one step and another two legs on an adjacent step. This could provide lighting for a photograph for example, or for interior painting of a building. Another use is having the flashlight on the flexible leg stand when performing electrical work inside a house. The fuse box is usually turned off for safety reasons and a light source is needed to illuminate the work space. Another use, while fishing, is to have a light aimed at water for providing a lure for attracting fish.

While the instant invention has particular application to portable lighting assemblies, it should be understood that it also has application to various other implements which by their nature are desirable to support at desired and various positions.

It is envisioned that one or more components of the invention may be manufactured from a high strength plastic or polymer. It is further contemplated that the components be interchangeable so as to provide the option to use variously sized clamping elements as the need should arise.

One such advantage is that the system may be used with a wide variety of differently sized lighting sources. Another advantage is that the lighting source maybe readily adjusted vis-a-vis the object to which the system is attached. Another advantage is that the flexibility of the legs provides stability for unusual surfaces, such as staircases, rocky ground, or on a car engine.

Other advantages will become obvious in light of the following figures and the disclosure and description of the preferred embodiments.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. An apparatus for holding an object comprising:

a clamp assembly having moveable jaws for holding an object; and a plurality of legs extending from the clamp assembly, each of the legs being a cable having a metal core and a layer of an elastomeric material, the legs being flexible and malleable to allow a user to bend the legs into a desired shape and to retain that shape, wherein the clamp assembly comprises: a base, the base having a cavity;

wherein a portion of each of the legs inserts into and is retained within the cavity; and wherein each of the legs comprises one-half of a one of the cables, each of the cables being bent into a bight and the bight inserted into the cavity.

2. The apparatus of claim 1 wherein the clamp assembly comprises: a base, the base having a cavity; and wherein a portion of each of the legs inserts into and is retained within the cavity.

3. The apparatus of claim 1 wherein the cavity has threads that engage the layer of elastomeric material.

4. An apparatus for holding an object comprising:

a clamp assembly having moveable jaws for holding an object, the clamp assembly having a base with a cylindrical cavity having a set of internal grooves;

a plurality of legs, each of the legs being a cable having a metal core and a layer of an elastomeric material, the legs being flexible and malleable to allow a user to bend the legs into a desired shape and to retain that shape, the legs having portions inserted into the cavity and functionally retained by the grooves, wherein each of the legs comprises one-half of one of the cables, each of the cables being bent into a bight and the bight inserted into the cavity.

5. The apparatus of claim 4 wherein the grooves comprise threads.

6. The apparatus of claim 4 wherein said clamp assembly further comprises:

a pair of clamp members; and a telescoping extension member between the clamp members and the base.

7. An apparatus for holding an object comprising:

a clamp assembly having moveable jaws for holding an object, the clamp assembly having a base with a cylindrical cavity having a set of internal grooves;

a plurality of legs, each of the legs being a cable having a metal core and a layer of an elastomeric material, the legs being flexible and malleable to allow a user to bend the legs into a desired shape and to retain that shape, the legs having portions inserted into the cavity and functionally retained by the grooves, wherein the grooves comprise threads and the cables are bent into a bight, the bight being engaged by the threads.

* * * * *